Dec. 28, 1954  H. P. HENRY  2,698,069
HYDRAULIC TOWING LINK
Filed Jan. 29, 1952
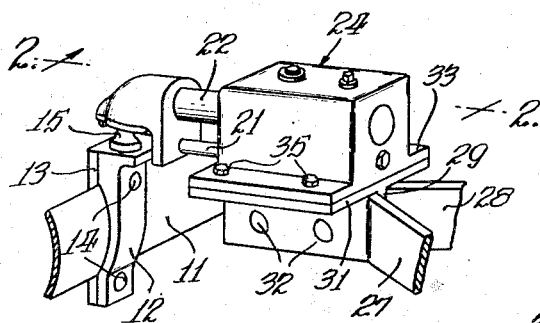
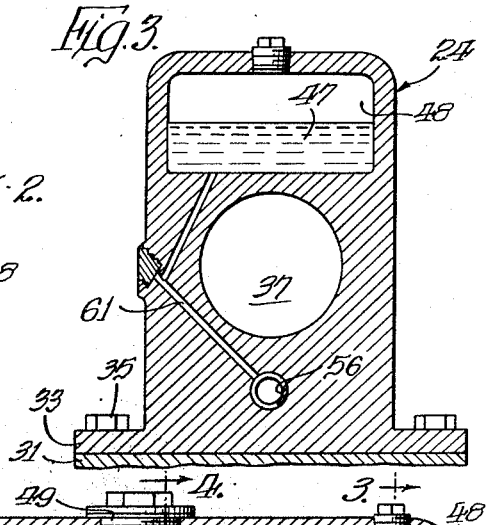
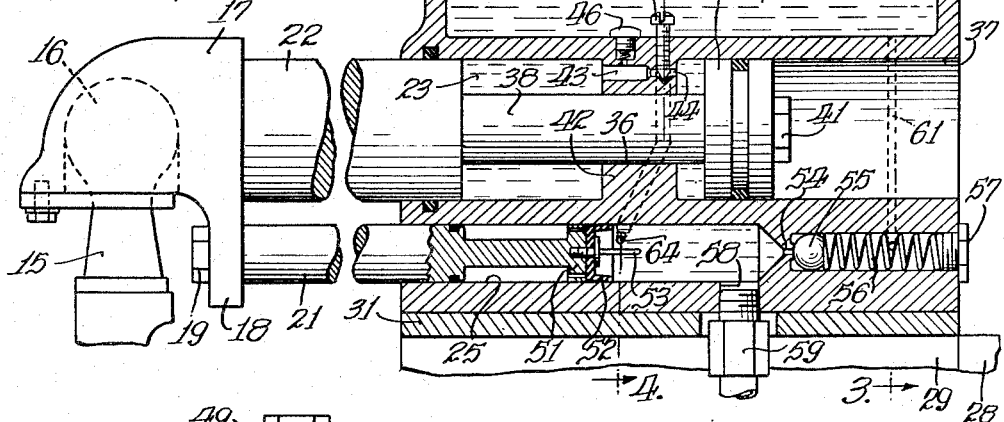
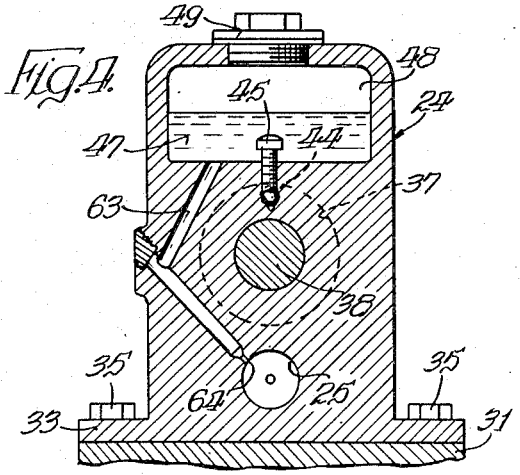
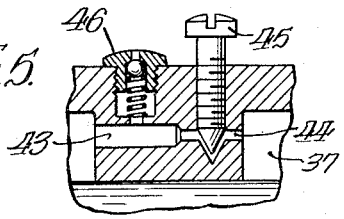
INVENTOR.
Howarth P. Henry
BY
Kegan and Kipnis
Attys.

United States Patent Office 2,698,069
Patented Dec. 28, 1954

2,698,069

HYDRAULIC TOWING LINK

Howarth P. Henry, Englishtown, N. J.

Application January 29, 1952, Serial No. 268,869

4 Claims. (Cl. 188—112)

My invention relates to towing apparatus, and concerns itself more particularly with a coupling linkage for connecting automobile vehicles in tandem, whereby the tractor vehicle, in addition to being mechanically coupled to the trailer vehicle, is also enabled to control more effectively the hydraulic braking mechanism thereof.

In coupling links of the type referred to, a pilot cylinder is contained within the coupling linkage and is hydraulically in communication with the master cylinder of the drawn vehicle. The piston of the pilot cylinder is directly connected to the coupling articulation, so that the forward motion of the tractor vehicle retracts the piston in the pilot cylinder, relieving the hydraulic braking pressure, but when the tractor vehicle is arrested in its forward motion, the pilot cylinder piston is advanced into compression, causing the master cylinder of the trailer vehicle to operate its wheel brakes for the purpose of checking the forward motion of the trailer vehicle. So long as forward motion and arrestment alone are involved in the traction operation, the tractor and drawn vehicles may be operated in unison without requiring extraordinary precaution or attention on the part of the tractor vehicle driver. However, when the occasion arises for requiring the two vehicles to be operated in reverse or back-up manner, the aforedescribed braking action of the pilot cylinder causes the drawn vehicle to apply its wheel brakes, thereby interfering with motion reversal operations.

In prior art devices of this class, various attempts have been made to overcome this problem of regulating a coupling link for reverse or back-up operation by providing manually operated means for bleeding the master cylinder or the pilot cylinder, but so far as is known, no such regulation has been designed to be effective without manual intervention or without predetermined setting. Both of these expedients are beset with practical disadvantages, not the least important of which is the danger of subsequent brake failure during the resumption of forward movement of both vehicles. Manual control more often than not required that the operator leave his driver position in order to check the necessary relief regulation, and even though such attention were infrequently required, the leaving of the tractor vehicle unattended even for short intervals of time is for obvious reasons attended with considerable hazard and contributory to traffic interference.

Accordingly, it is a principal object of the present invention to provide a coupling device for connecting a tractor automobile with a trailer vehicle attended with automatic brake regulating control of the drawn vehicle, but which nevertheless permits of a backing up operation to be performed without the exercise of local regulatory supervision and without requiring the driver to leave his operator's seat.

Another object of the present invention is to provide a coupling link for connecting a drawn to a drawing vehicle in a manner which will permit the drawing vehicle to exercise brake control over the drawn vehicle, but which will distinguish between the forward motion arresting operation and a backing up operation so far as the response of the drawn vehicle is concerned.

Another object of the present invention is to provide a coupling hitch such as may be applied to conventional automobile vehicles for connecting them in tandem, in which the hitch apparatus includes a pilot hydraulic cylinder and operating piston for controlling the drawn vehicle master brake cylinder and which may be bled to permit back-up operation of both vehicles, attended with prompt resumption of normal brake control conditions as soon as forward motion is resumed.

To the end of achieving the foregoing objects, my novel coupling mechanism comprises a conventional arrangement of hitch apparatus which connects the front axle structure of a drawn vehicle to the rear bumper of a drawing or tractor vehicle, having intermediate its length a pilot cylinder whose piston is connected to the forward vehicle so that compression is effected within the pilot piston chamber as soon as the forward vehicle is brought to a stop. The momentum or forward motion of the drawn vehicle causes the compression to take place in the pilot system, so that instantly this compression is transmitted to the master cylinder of the drawn vehicle and in turn to the hydraulic brake system thereof, bringing the drawn vehicle to rest under the influence of its own wheel brake action.

During a back-up operation, when the action on the pilot cylinder resembles the aforedescribed braking action, so far as relative motion between the two vehicles is concerned, motion is regulated under retarded movement conditions, and the pilot cylinder is permitted first to undergo a slowly responsive bleeding of its compression fluid. Toward the end of the back-up stroke, a relief valve is positively actuated, relieving the hydraulic pressure control fluid in the pilot piston chamber, so as to fully relieve the action on the braking system and to permit the drawn vehicle to be backed with the full freedom of action which customarily attends the idle rolling of such vehicle.

In order that my invention may be more fully disclosed, reference is had to the accompanying drawing, which illustrates one form of apparatus embodying the foregoing and such other principles, advantages, or capabilities as may be pointed out hereinafter as the ensuing description proceeds, or such as are inherent in the present invention. For purposes of clarity in explanation, the following description is explicit, and the accompanying drawing is supplemented with detailed illustrations, but it is distinctly to be understood that the particular disclosure is illustrative only, and that my invention is not thereby to be restricted.

In the annexed drawing:

Fig. 1 is a fragmentary perspective view of the forward portion of a coupling hitch embodying my invention, and shown applied to the rear bumper of a tractor vehicle;

Fig. 2 is a longitudinal, sectional view, taken approximately on line 2—2 of Fig. 1;

Fig. 3 is a transverse sectional view, taken approximately on line 3—3 of Fig. 2;

Fig. 4 is another transverse sectional view taken approximately on line 4—4 of Fig. 2; and, Fig. 5 is an enlarged, detail sectional view through the needle valve and restricted passageway of a cushion cylinder auxiliary device forming part of my invention.

In the following detailed description, as well as in the illustrations of the accompanying drawing, similar reference characters designate corresponding parts throughout.

Referring now more particularly to the drawing, there will be noted in Fig. 1 the rear bumper 11 of a tractor vehicle having attached thereto a pedestal clamp comprised of interfitting clamp members 12 and 13, bolted together as at 14, whereby to afford rigid support to an upstanding coupling pin 15 which terminates in a universal coupling ball head 16. The female coupling component consists of a principal body 17 having a ball receiving recess within which the ball head 16 is snugly nestled, and being integrally formed with a downwardly extending lip portion 18. The lip portion 18 is apertured to receive the securement bolt 19 which engages the forward end of the pilot control rod 21. The principal body 17 is shown to be integral with a paralleling rod 22 that enters the cylindrical chamber 23 of a housing structure 24, just as does the pilot control rod 22 its respective chamber 25.

The hitching device proper consists of a triangular arrangement of structural bars, the converging side elements 27 and 28 of which, are shown in Fig. 1 to embrace between them a downwardly extending flange 29 of a platform member 31, held secure by bolts or rivets 32. Platform 31 coincides with the flanged base 33 of housing member 24, and is bolted to it by means of the hexagonally headed stud screws 35. In this way, the housing 24, which may be advantageously manufactured as a monobloc, with its interior apertures variously cored and machined, will be understood to assume a rigid and inert relationship with respect to the triangular hitch device represented by the converging elements 27 and 28.

The principal housing or block member 24 has already been described as having a cylindrical bore 23. This bore is reduced into a continuation orifice concentrically of the bore 23 and designated 36, Fig. 2, whereafter it continues at substantially the original diameter, also in the same concentricity and thereat designated 37. Rod 22 is reduced as at 38 for a short portion of its length, terminating with a piston head 39 which may be secured to the reduced portion 38 by means of an end bolt 41. The wall section 42 which intervenes the two cylindrical chambers 23 and 37 is additionally penetrated by a bleeder aperture 43, Fig. 5, restricted as at 44 and thereat subjected to the adjustment regulation of a needle valve screw 45. Alongside the needle valve 45 is a lightly spring tensioned ball check valve 46 which permits replenishment of fluid from reservoir 48 to enter the check valve system but due to its characteristic one way action prevents flow back into the reservoir chamber.

Through the aforedescribed arrangement, the space which intervenes between the piston head 39 and the principal enlarged diameter of rod 22, with the exception of that portion occupied by the partitioning wall 42, is kept constantly supplied with and full of cushioning fluid, which serves the purpose of checking or retarding the action or movement of the rod 22 longitudinally with respect to the housing 24 and restricting this movement to a relatively slow rate, as permitted by the flow of fluid through the restricted passageway 44 on one side of the partitioning wall 42 traveling to the other.

Reservoir 48 is advantageously kept supplied with fluid to a partial extent only as indicated in Figs. 2 and 3, leaving a head as air space for a purpose which will become more evident during the following description. Occasional depletion of the reserve supply of fluid is periodically replenished through the supply aperture, closed by the plug screw 49.

The pilot cylinder which is a continuation of bore 25 formed in the base of monobloc 24, contains the piston head 51 with attached cup washer 52 to accomplish compression. This member mounts a foremost extending rod 53 in axial alignment with the piston head. The foremost extremity of bore 25 converges abruptly to a small bleeder opening 54 normally held sealed by a ball valve 55, which is urged into its closed position by a compression spring 56, isolating the piston chamber from the cylindrical chamber within which are housed the ball valve 55, its spring 56, and the sealing plug 57.

Sideward of the piston bore 25 there communicates an aperture 58 to which is attached the screw threaded fitting 59 which forms part of an attachment conduit communicating with the master cylinder of the braking control system which relates to the drawn or trailer vehicle.

The large escape bore or spring chamber 56 which contains ball valve 55 communicates through a side channel 61 with the reservoir fluid 47, Fig. 3, so that when the valve 55 becomes displaced, permitting the restricted aperture 54 to communicate with the spring chamber 56, hydraulic pressure is relieved through the communication channel 61 to the much reduced pressure level which prevails in the air chamber 48.

Another channel of communication designated 63, which may be arranged similar to the aforedescribed channel 61, permits reserve supply fluid from the reservoir 47 to trickle into the compression chamber 25 in front of piston 51 when the latter member is fully withdrawn as shown in Fig. 2. As soon as the piston starts into forward motion, however, as in the case of the rear vehicle attempting to overtake its tractor, the aperture 64 is sealed off by the cup washer 52, with the result that further compression increases the pressure of the captive fluid actuating the master cylinder of the trailer vehicle as a first consequence, and exerting a pressure to overcome spring 56 and unseat ball valve 55 as a secondary consequence, conditioned upon the attainment of adequate pressure.

The last described condition of sufficient overpressure to unseat ball valve 55 is attained when the tractor vehicle is backed or reversed in its direction of movement while the trailer vehicle is held relatively immobile by the increasing pressure of its hydraulic braking system under impetus of the pilot pressure transmitted through conduit fitting 59. The eventual consequence of overcoming ball valve 55 and of permitting the excessive pressure to bleed through the channel 61 into the reservoir chamber 48 results in the approach of piston head 51 to its foremost extremity until the prod 53 enters the restricted aperture 54, whereafter it engages the ball valve 55 positively maintaining it in an open condition and permitting the pressure head to be totally spent. This releases all of the trailer vehicle brakes instantly, since it also relieves the pressure which has been transmitted to the master cylinder, and thereafter the vehicles may be backed indefinitely without encountering any inadvertent braking action, such as has been described to ensue from an attempt to back the tractor vehicle.

Under other conditions of operation, my back-up brake release apparatus serves the purpose of relieving the brake action upon the trailer vehicle during operation of the tandem on long descents. This is accomplished by first bringing both vehicles to a standstill. Then the tractor vehicle is backed slowly until the trailer brakes are released. Thereafter forward motion is resumed. Under such conditions of operation, when the trailer vehicle brakes become ultimately released, both vehicles will descend under the more desirable braking action of first or second gear transmission coupling, which utilizes retardation by motor braking. If braking action is then required, a slight acceleration will restore the system to reactivate the brakes.

A further advantage of the relief valve arrangement is to safeguard the entire hydraulic system against instantaneous overpressures such as might result from even minor rear collisions. Sometimes during short back up, as for parking, encounter with obstructions generates enormous pressures in the fluid system. The relief action of ball valve 55 and the ultimate relief by rod 53 will prevent such over pressures from developing.

Most important of the features to be noted with regard to my invention is that following either of the aforedescribed examples of braking release and upon resumption of normal traction, the piston 51 moves to its forward position as shown in Fig. 2, whereupon the reserve supply of fluid from reservoir chamber 48 at once enters through its port 63 to replenish any fluid which has been driven back due to the operation of the brake release feature just described.

Having thus fully disclosed my novel braking apparatus and its utility relief features for vehicle tandem control and demonstrated by reference to a specific embodiment its manner of advantageous operation, I claim as my invention:

1. Apparatus for coupling and braking a trailer vehicle comprising a housing normally secured to said vehicle, with a compression chamber in said housing; a piston adapted to be secured to a tractor vehicle and to be reciprocated by said tractor vehicle, said piston moving toward one end of said compression chamber to perform braking strokes and in the opposite direction to perform return strokes; a closed reservoir chamber; a duct leading from said compression chamber, adjacent one end, to a hydraulic brake system of the trailer vehicle; a second duct leading from said compression chamber adjacent said end, extending in a direction parallel to said braking strokes, and connected with said reservoir chamber; a normally closed relief valve interposed in said second duct, yieldable in the direction of said braking strokes upon a predetermined high pressure condition in said compression chamber, said valve when open thereby relieving the pressure then prevailing in said compression chamber in order to facilitate backing up of the vehicles; and a third duct leading from the reservoir chamber to the compression chamber for return flow to the latter.

2. Apparatus for coupling and braking a trailer vehicle comprising a housing normally secured to said vehicle, with a compression chamber in said housing; a piston adapted to be secured to a tractor vehicle and to be reciprocated thereby in said chamber to perform braking strokes toward one end of the chamber and return strokes in the opposite direction; a prod member secured to the piston and extending in the direction of said strokes; a closed reservoir chamber; a duct leading from said compression chamber, adjacent said end, to a hydraulic brake system of the trailer vehicle; a second duct leading from said compression chamber adjacent said end, in the direction of said strokes, and connected with said reservoir chamber; a normally closed relief valve interposed in said second duct and yieldable in the direction of said braking stroke to open upon continuation of the braking stroke beyond full braking conditions, thereby to relieve the pressure then prevailing in the compression chamber and brake system to the reservoir chamber in order to facilitate backing up of the vehicles; and a third duct leading from the reservoir chamber to the compression chamber for return flow to the latter.

3. In a tractor-trailer hitch the combination including a housing; a cushioning means in said housing; a compression chamber in said housing; a reciprocable piston in said chamber, said piston being movable directly by said tractor toward one end of said chamber to perform braking strokes and return strokes in the opposite direction; a prod member secured to the piston and extending in the direction parallel to said braking strokes; a closed reservoir chamber; a duct leading from said compression chamber, adjacent one end, to a hydraulic brake system of the trailer vehicle; a second duct leading from said compression chamber adjacent said end and connected with said reservoir; a normally closed relief valve interposed in said second duct, yieldable in the direction of said braking stroke to open upon continuation of the braking stroke beyond full braking conditions thereby to relieve the pressure then prevailing in the compression chamber and brake system to the reservoir chamber in order to facilitate backing up the vehicles; and a third duct leading from the reservoir chamber to the compression chamber for return flow to the latter.

4. In a coupling device for tractor and trailer vehicles having a housing and a compression chamber therein, the combination including a piston adapted to be secured to said tractor vehicle and reciprocated thereby within said chamber; a pressure take-off adjacent one end of said chamber and leading to a brake system in the trailer vehicle; a normally closed relief valve adjacent said end and yieldable in the direction of piston movement to open upon a predetermined high pressure condition in said chamber; a prod member secured to the piston and extending in the braking stroke direction of piston movement; whereby during a braking stroke of said piston, said valve opens upon continuation of the braking stroke beyond full braking conditions thereby to relieve the pressure in said chamber and brake system in order to facilitate backing up the vehicles.

References Cited in the file of this patent

UNITED STATES PATENTS

| Number | Name | Date |
|---|---|---|
| 897,676 | Thompson | Sept. 1, 1908 |
| 1,315,570 | Paris | Sept. 9, 1919 |
| 1,318,298 | Paris | Oct. 7, 1919 |
| 1,896,427 | Selvester | Feb. 7, 1933 |
| 2,149,188 | Shaffer | Feb. 28, 1939 |
| 2,149,189 | Shaffer | Feb. 28, 1939 |
| 2,189,335 | Ace et al. | Feb. 6, 1940 |
| 2,317,594 | Ericson | Apr. 27, 1943 |
| 2,557,880 | Lynn | June 19, 1951 |
| 2,571,323 | Yoder | Oct. 16, 1951 |